(No Model.)

C. T. McCUE.
BALL BEARING AXLE.

No. 578,892.  Patented Mar. 16, 1897.

Witnesses
Harry E. Hart.
Arthur B. Jenkins.

Inventor
Charles T. McCue.
By Chas. L. Burdett,
Attorney.

THE NORRIS PETERS CO., PHOTO-LITHO., WASHINGTON, D. C.

UNITED STATES PATENT OFFICE.

CHARLES T. McCUE, OF HARTFORD, CONNECTICUT.

BALL-BEARING AXLE.

SPECIFICATION forming part of Letters Patent No. 578,892, dated March 16, 1897.

Application filed December 7, 1896. Serial No. 614,846. (No model.)

*To all whom it may concern:*

Be it known that I, CHARLES T. MCCUE, a resident of Hartford, in the county of Hartford and State of Connecticut, have invented certain new and useful Improvements in Ball-Bearing Axles, of which the following is a full, clear, and exact description, whereby any one skilled in the art can make and use the same.

The object of my invention is to provide a ball-bearing axle which is so constructed as to readily meet all the requirements of use of an ordinary wagon-wheel and which shall be capable of adjustment as to the ball-bearing parts so as to provide for the taking up of wear, and this without the use of any except the ordinary tools commonly at the disposal of the user of a wagon.

To this end my invention consists in the combination of the several parts making up the device as a whole and in the details of construction of such parts, as hereinafter described, and more particularly set out in the claims.

Figure 1:
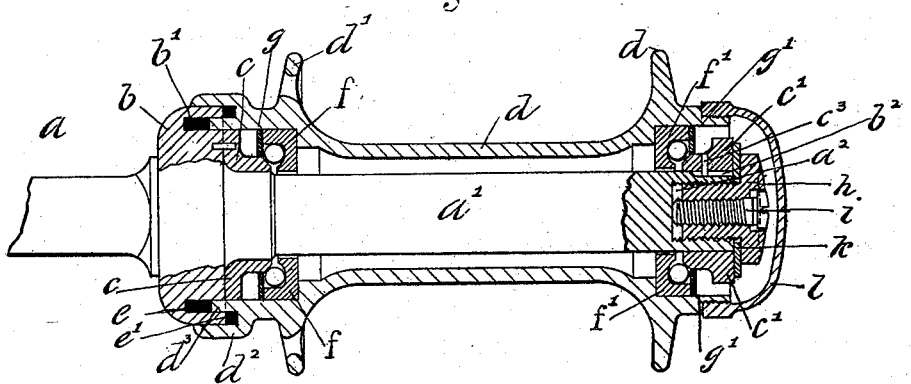
Figure 2:
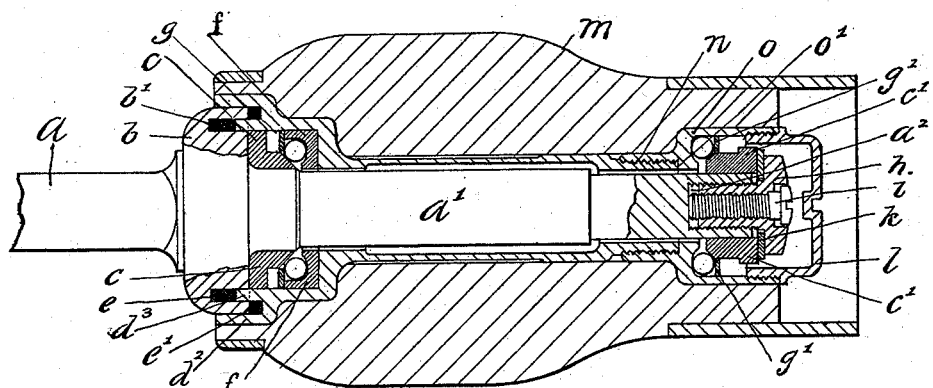
Figure 3:
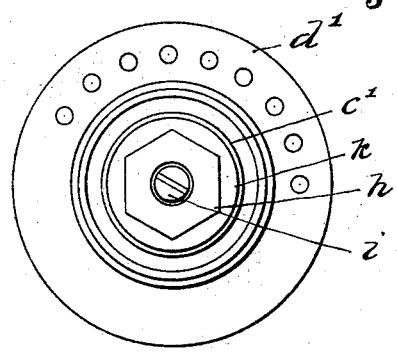

Referring to the drawings, Figure 1 is a view in central section of an axle-box and in side view of an axle-arm, the latter being broken away to show construction. Fig. 2 is a like view illustrating the adaptation of my invention to a wooden hub. Fig. 3 is an end view of the outer end of the axle-arm with the cap removed and showing the adjustability of the device.

In the accompanying drawings, the letter $a$ denotes an axle provided at its outer end with the usual axle-arm $a'$. A shoulder $b$ is located at the inner end of the axle-arm, and this shoulder has a channel $b'$ opening toward the end of the arm. The outer end of the axle-arm is provided with a threaded socket $a^2$, extending lengthwise into the arm. A cone $c$ is borne on the arm at its inner end, this cone being backed up by the shoulder $b$ and the periphery of the cone being preferably located inside the boundary-line of the channel $b'$ in the shoulder $b$.

The letter $d$ denotes the metallic hub of the wheel of the suspension type, this hub having flanges $d'$, in which are located openings for the reception of the wire spokes commonly included in the construction of wheels of this class. The inner end of this hub has a circular channel or groove forming dust-excluding flanges $d^2$ $d^3$, the inner flange $d^3$ being preferably shorter than the outer flange $d^2$. These flanges are located in such position that the inner flange $d^3$ shall project into the channel $b'$ and the outer flange $d^2$ lie closely against the outer surface of the shoulder $b$ on the axle.

Washers $e$ and $e'$, preferably of felt or like material, are located in the channels in the shoulder $b$ and hub $d$, respectively. The cone $c$ is held against rotation on the hub in any desired manner, preferably as by means of pins projecting into the cone and into the shoulder on the hub, as shown in the drawings.

A ball-case $f$ is secured in the inner end of the hub in operative relation to the cone $c$, and a ring $g$ is secured in the hub next to the case in such manner as to prevent the balls from dropping out of the ball-race when the hub is removed from the axle-arm.

A cone $c'$ is located at the outer end of the axle-arm and is adapted to lengthwise movement thereon. A lug $c^3$ or like part on the inner surface of the cone $c'$ projects into a lengthwise grooove $b^2$ in the outer end of the axle-arm for the purpose of preventing the rotation of the cone. A ball-case $f'$ is secured in any suitable manner in the outer end of the hub $d$ and in operative relation to the cone $c'$, and a ring $g'$ is also secured in this end of the hub for the purpose of preventing the balls from dropping out of the ball-race when the wheel with the hub is removed from the axle-arm.

A tubular bolt $h$ is located in the threaded socket $a^2$ and a set-screw $i$ projects through this bolt and is adapted to abut against the bottom of the socket $a^2$. The head of the tubular bolt overlies the cone $c'$, and a metallic washer $k$ may, if desired, be interposed between the head of the bolt and the cone. The tubular bolt $h$ is preferably counterbored for the reception of the head of the set-screw. By means of this construction the cone $c'$ may be located at any position longitudinally on the axle-arm for the purpose of taking up wear, the movement of the cone being effected by the rotation of the bolt. When the desired adjustment is obtained, the set-screw $i$ is turned to place with its inner end thrusting against the bottom of the socket in the end of the axle-arm, thus preventing the rotation of the bolt.

A cap $l$ may be used for the purpose of inclosing the parts at the outer end of the hub.

In the device shown in Fig. 2 the hub $m$ of the wheel is provided with an axle-box made practically in two sections, the inner of which is the axle-box proper with a thread $n$, formed on the reduced outer end of the axle-box. On this portion is secured by means of interengaging screw-threaded parts the ball-case $o$, having a shoulder $o'$ at the base of the threaded socket in the inner end of the ball-case, which shoulder strikes against the outer end of the inner section of the axle-box. This ball-case is the counterpart of the ball-case used in the first-described form of the device practically. The material features of cone adjustably mounted on the outer end of the axle-arm and the cone-adjusting bolt and set-screw are the same as already described with reference to the other form of the device. In the device of Fig. 2, however, the pin and interengaging lug and groove on the cone and axle shown in Fig. 1 as a means of preventing rotation of the cone have been omitted, they not having been deemed necessary for the purpose of properly illustrating the invention in connection with a wagon-wheel. In said Fig. 2 the cap is shown as threaded externally to fit an interior screw-thread in the ball-case, whereas in Fig. 1 the cap is internally threaded to fit an exterior screw-thread on the hub of the wheel. It is obvious that the devices shown in one of said figures and omitted from the other may be equally applied to either device, to an extent not made necessary by the special construction of wheel in which the device is applied. This modified form of the construction is the one adapted particularly for use in a wheel having a wooden hub, as illustrated at $m$, this hub being provided with the usual metallic ferrules at the inner and outer ends and with sockets for the spokes. The hub has a central opening bored therethrough of a diameter equal to that of the axle-box just back of the threaded end and is then counterbored at the inner end to form a socket for the enlarged end of the axle-box which contains the ball-case and is provided with the dust-excluding flanges. The outer end of the hub is also counterbored to receive the ball-case, which is secured to the axle-box by means of the interengaging threaded parts above described.

I claim as my invention—

1. The combination with an axle-arm having a shoulder and a channel in the face thereof, of a cone surrounding the axle-arm at the base and secured thereto, there being a threaded socket opening at the outer end of the axle-arm, an axle-box having open and enlarged sockets at the opposite ends, cases located within said sockets, the inner end of the axle-box having two projecting flanges the outer of which fits upon the periphery of the shoulder and the inner flange fitting the channel in the face of the shoulder, a cone borne on the outer end of the axle-arm and adjustable lengthwise thereon, a tubular bolt with a threaded shank fitting the threaded socket in the end of the axle-arm, the head of the bolt overhanging the cone, and a set-screw fitting a threaded socket in the bolt and with its end projecting beyond the inner end of the bolt.

2. In a ball-bearing axle, in combination with the axle-arm having a central socket in the outer end, a cone adjustably mounted on the end of the axle arm, and the cone-adjusting clamp comprising a tubular bolt having a threaded socket, and a threaded set-screw extending lengthwise through the bolt, and the ball-bearing case and balls.

3. In combination with an axle-arm having a shoulder and an annular channel in the face thereof, an axle-box having two projecting flanges, the outer longer than the inner and adapted to embrace the flange formed at the outer edge of the shoulder on the axle-arm, annular washers lying within the channels, and ball-bearing cases and cones secured to the axle-box and axle-arm at the opposite ends of the box, and the bolt secured to the outer end of the axle-arm with its head overhanging the outer surface of the adjustable cone.

CHARLES T. McCUE.

Witnesses:
CHAS. L. BURDETT,
ARTHUR B. JENKINS.